July 9, 1963     E. H. HANSEN     3,096,897
INSULATED CONTAINER AND CLOSURE THEREFOR
Filed March 14, 1960     2 Sheets-Sheet 1
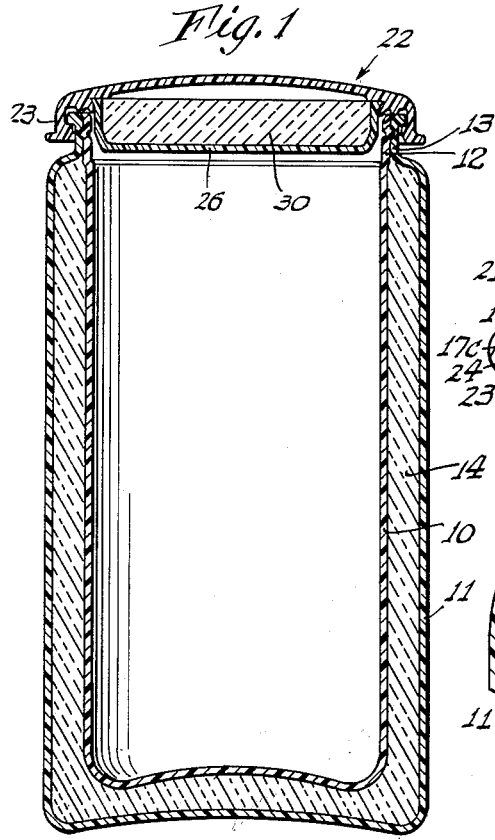
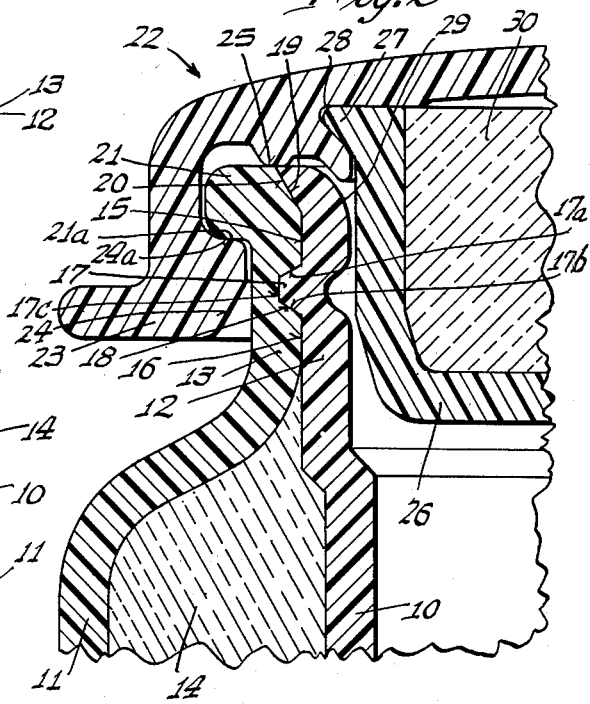
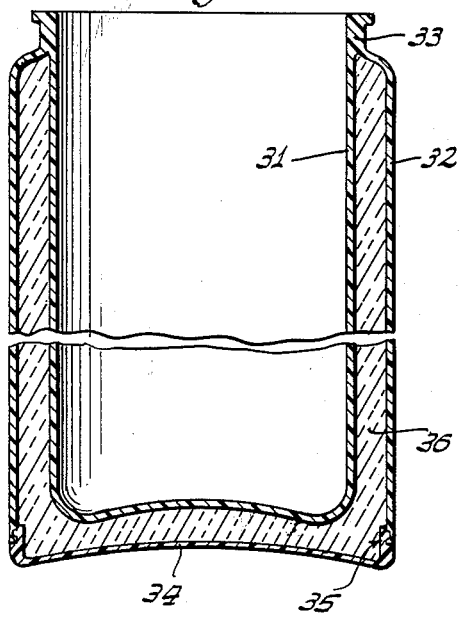
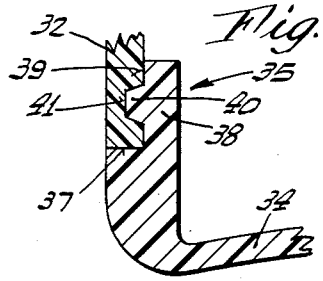
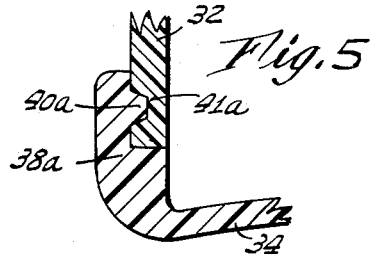
INVENTOR.
Erik H. Hansen
BY
Johnson and Kline
ATTORNEYS INVENTOR.
Erik H. Hansen United States Patent Office 3,096,897
Patented July 9, 1963

3,096,897
INSULATED CONTAINER AND CLOSURE
THEREFOR
Erik H. Hansen, Fairfield, Conn., assignor to Plastica Inc., Milford, Conn., a corporation of Connecticut
Filed Mar. 14, 1960, Ser. No. 14,800
2 Claims. (Cl. 215—13)

The present invention relates to insulated containers of thermoplastic material and to a novel closure means therefor.

It is an object of the present invention to provide an insulated container of thermoplastic material which is of simple construction and which is easy to manufacture and assemble.

One form of such invention employs blown units of thermoplastic material which are assembled to provide an inner container and an outer casing with an insulating space therebetween, which units are held in assembled relation by a novel joint and neck construction thereof.

Another form of insulated container comprises an injection molded inner container having an integrally formed outer casing in spaced relation thereto and closed by a lower section secured over the end of the outer casing and to the wall of the outer casing by the novel joint construction.

Another object of the invention is to provide novel closure means for said insulated container.

Other features and advantages of the invention will be apparent from the specification and claims when considered in connection with the accompanying drawings in which:

FIGURE 1 shows a sectional view of the container with a closure in position thereon.

FIG. 2 is an enlarged view of the closure construction and the joint securing the inner and outer portions of the insulated container together.

FIG. 3 is a sectional view showing another form of insulated container.

FIG. 4 is an enlarged sectional view of the joint between the outer casing and the closure therefor.

FIG. 5 is a view similar to FIG. 4 of another form of closure joint.

Figure 6:
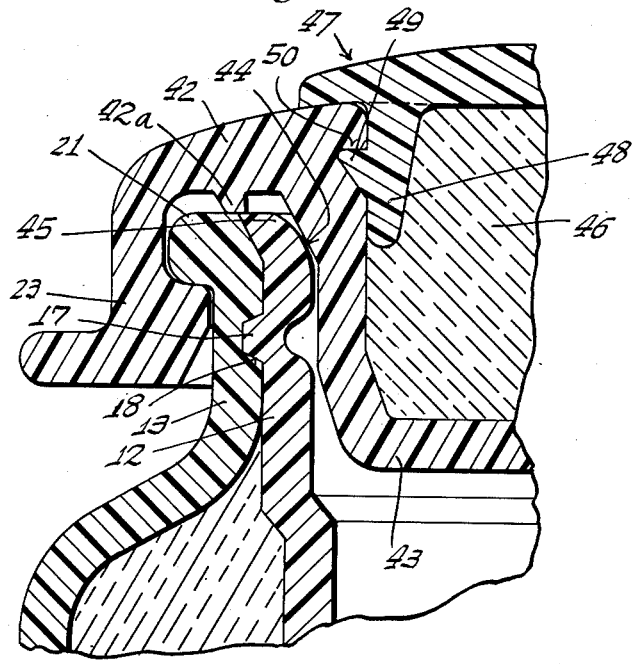
FIG. 6 is a view similar to FIG. 2 showing another type of closure for the insulated container.

As shown in FIG. 1, the insulated container comprises two units, an inner container 10 and an outer casing 11, each having a neck portion 12, 13. The neck portions which are concentric and nested cooperate to lock the inner container and outer casing together and to securely hold them in spaced relation. The space between the inner container and outer casing provides the insulation for the container and may be filled with an insulating material 14 such as Fiberglas or the like. The units forming the container and casing are self-sustaining and are preferably blow molded from resilient and locally distortable thermoplastic material such as polyethylene, polyvinyl copolymers and other suitable synthetic thermoplastic materials.

In the form of the invention illustrated in FIG. 1, it will be noticed that the inner container has an outer diameter which is not greater than the inner diameter of the neck 13 of the outer casing so that it may be readily inserted into the outer casing through the neck thereof.

As shown in FIG. 2, the concentric necks of the inner container and casing are provided with cooperating cylindrical surfaces 15, 16 on either side of a rib 17 formed on the inner neck and projecting into a cooperating recess 18 formed in the outer neck. While the rib may take various forms, it is at present preferred to form it with converging sides 17a, 17b and a flattened top 17c. The outer end of the neck of the inner container is provided with an outwardly extending conical portion or lip 19 which is adapted to cooperate with and be seated in a correspondingly shaped recess 20 formed on the neck portion of the casing. The cooperating neck portions, it will be seen, form the joint between the inner container and outer casing which enables the two to be readily assembled by inserting the inner container into position within, and snapped into interlocked relation with, the outer casing due to the local distortion of the two neck portions. The cylindrical surfaces of the joint will, in effect, accurately locate the inner container within the outer casing and maintain the spaced relation therebetween. The two are held against relative displacement due to the fact that the groove 18 effectively grips the rib 17. Also, the portion of the outer neck between the rib 17 and conical portion 19 is gripped thereby and assists in holding the container and casing in position.

The combined neck portions form an open mouth for the inner container and the outer neck is provided with a peripheral rim 21 forming shoulder 21a. The present invention provides a closure 22 for the insulated container.

As shown in FIGS. 1 and 2, the closure extends over the mouth of the container and has a dependent flange 23 having a conical edge 24 which engages the rim 21 and enables a bead 24a to be snapped under the shoulder 21a of said rim to secure the closure in place. The closure is preferably made of similar resilient and locally distortable material as the container which facilitates its application and removal from the container. On the inner surface of said closure is a rib 25 adapted to be pressed against the end of the necks and preferably overlie the joint therebetween to effect a secure seal for the contents of the container.

If desired, a stopper 26 can be provided on the closure to extend into the inner neck portion and seal the inner container. In the form of the invention shown in FIG. 2, the stopper unit is removably secured to the closure by an outwardly extending lip 27 which is adapted to be snapped into a groove 28 formed in the closure. It is preferably located in that portion of the closure overlying the inner edge 29 of the neck, as shown in FIG. 2, and effectively holds and controls the flexing of the closure as it is snapped into position. If desired, insulating material 30 can be placed within the stopper before it is snapped into place.

In the form of the invention shown in FIG. 3, the inner container 31 and outer wall 32 are connected to a neck portion 33 forming the mouth of the inner container and are formed by an injunction molding operation. The space between the inner container and outer wall is closed by a bottom member 34 having a portion 35 extending into overlapped relation with the outer wall and provided with a joint similar to that joining the neck portions of FIG. 1 to form the outer casing for the insulated container. If desired, insulating material 36 can be inserted between the inner container and outer casing.

As shown in FIG. 4, the outer wall abuts a shoulder 37 on the bottom and the bottom has the overlapped portion formed as a wall 38 extending into the lower end of the outer wall, the overlapped portions of the walls 32 and 38 and bottom having concentric cylindrical contacting surfaces 39 with the rib 40 formed on the bottom portion cooperating with a groove 41 formed in the outer wall. When the bottom is snapped into position with the rib disposed in the groove and the end of the wall abutting the shoulder 39, the concentric cylindrical parts spaced on either side of the rib and groove maintain the parts in alignment and in assembled relation in which the groove in the outer wall grips the rib and the outer wall is gripped between the rib and abutting shoulder of the bottom.

The form of the invention shown in FIG. 5 is a reversal of the parts of FIG. 4 in that the projecting wall 38a of the bottom member is positioned to overlap the outer surface of the wall and is provided with a rib 40a extending into a groove 41a in the outer casing.

Another form of closure for the insulated container is shown in FIG. 6 wherein the closure formed of resilient and locally distortable thermoplastic material is provided with an annular portion 42 overlying the end of the neck and having a flexible sealing portion 42a to engage the end of the neck, said annular portion having at its outer edge the depending flange 23 shaped to cooperate with the rim as described in connection with FIG. 2. The inner edge of the annular portion 42 is provided with an integral hollow stopper 43 having an opening at its outer end leading to the interior thereof and adapted to be inserted into the neck. The outer surface of the stopper is provided with an inclined portion 44 merging with the undersurface of the annular portion to produce a thickened section to reinforce the closure adjacent the curved inner edge 45 of the neck portion. The stopper may be filled with insulating material 46 and have its open end closed by a cap 47. As shown in FIG. 6, the cap engages the upper surface of said annular portion and has a depending flange 48 adapted to extend into the interior of the stopper and preferably to overlie the inner wall of the stopper opposite said inclined outer surface thereof to reinforce the seal formed thereby. The cap is provided with a rib 49 formed on the flange adapted to be snapped into a groove 50 formed in the wall of the annular portion above the stopper as shown in FIG. 6 to hold the cap in place.

From the foregoing it will be seen that the devices of the present invention can be readily formed by blow molding or injection molding and can be easily assembled into an effective insulated container having a simple closure therefor.

Variations and modifications may be made within the scope of the claims and portions of the improvements may be used without others.

I claim:
1. An insulated container of resilient thermoplastic material comprising an inner container and a surrounding outer shell having an insulating space therebetween, a neck portion connected to said container and casing and forming a mouth for the insulated container and having an outer rim, and a closure for said mouth including a hollow stopper portion having an opening at its outer end leading to the interior thereof adapted to be inserted into the neck portion, an annular portion extending outwardly from the stopper, a depending wall at the edge of the annular portion having means interlocking with said rim to hold the closure thereto, the annular portion having a sealing rib portion pressed against the end of said neck portion to seal the mouth, and a cap for closing the opening at the outer end of the stopper, said cap having a portion engaging the outer face of the annular portion and a flange inserted into the opening, said flange having a rib of right triangular cross-section extending into a correspondingly shaped cooperating groove formed in said annular portion above the stopper portion with the base of the triangle facing the outer end of the stopper and the hypotenuse of the triangle facing the sealing portion of the stopper.

2. An insulated container of thermoplastic material comprising an inner container and an outer casing, each connected to a projecting cylindrical neck portion forming a mouth for said insulated container and positioning said container and casing to provide a space therebetween, insulation in said space, said neck portions being nested and having a rib and a cooperating groove spaced intermediate the ends of said neck portions so as to releasably connect the containers together with the cylindrical walls of the neck portions forming aligning surfaces for the container and casing to maintain them in spaced relation, said neck portions having overlapped joints in the end portion at the other end thereof, and a closure mounted on the container to extend over said mouth and having a sealing rib portion pressed into sealing relation with the end of said neck portions, said closure having a stopper provided with a rim of right triangular cross-section releasably secured in a correspondingly shaped groove in the undersurface thereof with the base of the triangle facing the closure and the hypotenuse of the triangle facing the mouth of the container, said stopper being adapted to be inserted into the neck and having a sealing portion to seal the mouth.

References Cited in the file of this patent
UNITED STATES PATENTS

| | | |
|---|---|---|
| 2,711,766 | Archer | June 28, 1955 |
| 2,776,691 | Tupper | Jan. 8, 1957 |
| 2,837,232 | Rossi | June 3, 1958 |
| 2,895,636 | Martin | July 21, 1959 |
| 2,944,690 | Darmstadt | July 12, 1960 |
| 2,981,430 | Tsien et al. | Apr. 25, 1961 |